United States Patent [19]
Anderson et al.

[11] Patent Number: 6,156,835
[45] Date of Patent: Dec. 5, 2000

[54] POLYMER-ORGANOCLAY-COMPOSITES AND THEIR PREPARATION

[75] Inventors: Kenneth W. Anderson, Lake Jackson; Chai-Jing Chou, Missouri; Jerry E. White, Lake Jackson; Christine A. Polansky, Brazoria, all of Tex.

[73] Assignee: The Dow Chemical Company, Midland, Mich.

[21] Appl. No.: 09/117,768

[22] PCT Filed: Dec. 22, 1997

[86] PCT No.: PCT/US97/23861

§ 371 Date: Aug. 5, 1998

§ 102(e) Date: Aug. 5, 1998

[87] PCT Pub. No.: WO98/29491

PCT Pub. Date: Jul. 9, 1998

Related U.S. Application Data

[60] Provisional application No. 60/034,620, Dec. 31, 1996.

[51] Int. Cl.$^7$ ...................................................... C08K 3/34
[52] U.S. Cl. .......................... 524/445; 524/449; 524/450; 524/451; 524/534; 524/789; 524/791
[58] Field of Search ..................................... 524/445, 449, 524/450, 451, 534, 739, 791; 523/216

[56] References Cited

U.S. PATENT DOCUMENTS

| | | |
|---|---|---|
| 3,305,528 | 2/1967 | Wynstra et al. . |
| 4,528,235 | 7/1985 | Sacks et al. . |
| 4,533,693 | 8/1985 | Wolfe et al. . |
| 4,618,528 | 10/1986 | Sacks et al. . |
| 4,739,007 | 4/1988 | Okada et al. . |
| 4,810,734 | 3/1989 | Kawasumi et al. ...................... 523/216 |
| 4,874,728 | 10/1989 | Eilliott et al. . |
| 4,889,885 | 12/1989 | Usuki et al. ............................. 524/445 |
| 5,149,768 | 9/1992 | White et al. . |
| 5,171,820 | 12/1992 | Mang et al. . |
| 5,275,853 | 1/1994 | Silvis et al. ............................. 428/35.4 |
| 5,385,776 | 1/1995 | Maxfield et al. . |
| 5,496,910 | 3/1996 | Mang et al. . |
| 5,554,670 | 9/1996 | Giannelis et al. . |

FOREIGN PATENT DOCUMENTS

| | | |
|---|---|---|
| WO 93/04117 | 3/1993 | WIPO . |
| WO 93/11190 | 6/1993 | WIPO . |
| WO 95/14733 | 6/1995 | WIPO . |
| WO 96/08526 | 3/1996 | WIPO . |

OTHER PUBLICATIONS

Abstract for DE 3615181 A1.
Clemens, H. P., et al., *Aquaculture Digest*, "Aramid Fibers", vol. 3, pp. 213–242, (1978).
"Composites, High Performance", Kirk–Othmer Encyclopedia Chemical Technology Supplement, pp. 260–263, (1978).
Lan, T., et al., Chemical Materials, "Mechanism of Clay Tactoid Exfoliation in Epoxy–Clay Nanocomposites", 7, pp. 2144–2150, (1995).
Messersmith, P. B. et al., *Journal of Polymer Science: Part A: Polymer Chemistry*, "Synthesis and Barrier Properties of Poly(ε–Caprolactone)–Layered Silicate Nanocomposites", vol. 33, pp. 1047–1057, (1995).
Messersmith, P. B. et al., *Chemical Materials*, "Synthesis and Characterization of Layered Silicate–Epoxy Nanocomposites", 6, pp. 1719–1725, (1994).
Reichle, W. T., *Journal of Catalysts*, "Catalytic Reactions by Thermally Activated, Synthetic, Anionic Clay Minerals", 94, pp. 547–557, (1985).
Shi, H. et al., *Chemical Materials*, "Interfacial Effects on the Reinforcement Properties of Polymer–Organoclay Nanocomposites", 8, pp. 1584–1587, (1996).
Wang, M. S. et al., Chemical Materials, "Clay–Polymer Nanocomposites Formed from Acidic Derivatives of Montmorillonite and an Epoxy Resin", 6, pp. 468–474, (1994).

*Primary Examiner*—Mark L. Warzel
*Attorney, Agent, or Firm*—Nemia C. Damocle

[57] ABSTRACT

A polymer composite comprising a hydroxy-phenoxyether or polyester polymer matrix having dispersed therein layers of an inorganic material derived from a multilayered inorganic material having organophilic properties. The dispersion of the multilayered inorganic material in the polymer matrix is such that an increase in the average interlayer spacing of the layered inorganic material occurs. This increase in interlayer spacing occurs to a significant extent resulting in the formation of a nanocomposite. The polymers are preferably derived from a diglycidyl ether or ester or an epihalohydrin and a dinucleophile such as a dicarboxylic acid, a difunctional amine, a bisphenol or a sulfonamide. As the organophilic inorganic material clay minerals modified with organic ammonium compounds are used.

21 Claims, No Drawings

POLYMER-ORGANOCLAY-COMPOSITES AND THEIR PREPARATION

This application claims benefit of Provisional Application No. 60/034,620 filed Dec. 31, 1996.

The present invention relates to a polymer composite comprising a polymer and an inorganic additive, more specifically, layers of a swellable material, and to a method for preparing the polymer composite.

Polymer composites comprising a polymer matrix having one or more additives such as a particulate or fiber material dispersed throughout the continuous polymer matrix are well known. The additive is often added to enhance one or more properties of the polymer.

Useful additives include inorganic layered materials such as talc, smectite clays and mica of micron size. These materials can also be referred to as inorganic silicates. However, other inorganic layered materials which do not contain silicon may also be used.

A number of techniques have been described for dispersing the inorganic layered material into a polymer matrix. It has been suggested to disperse individual layers, for example, platelets, of the layered inorganic material, throughout the polymer. However, without some additional treatment, the polymer will not infiltrate into the space between the layers of the additive sufficiently and the layers of the layered inorganic material will not be sufficiently uniformly dispersed in the polymer.

To facilitate a more uniform dispersion of the layered inorganic material in the polymer, as described in U.S. Pat. No. 4,889,885, sodium or potassium ions normally present in natural forms of inorganic silicates or mica-type silicates and other multilayered particulate materials are exchanged with onium ions (for example, alkylammonium ions or suitably functionalized organosilanes). This cation exchange process can render the normally hydrophilic mica-type silicates organophilic and expand the interlayer distance of the layered material. The organophilic mica-type silicates include those materials commonly referred to as organoclays. Other processes may also render the previously hydrophilic mica-type silicate organophilic. Subsequently, the layered material (conventionally referred to as "nanofillers") is mixed with a monomer and/or oligomer of the polymer and the monomer or oligomer polymerized. The nanofiller may also be melt-compounded or melt-blended with polymer. Blending the nanofillers with the monomer, oligomer or polymer results in an increase of the average interlayer distance of the layered material.

In WO 93/11190, an alternative method for forming a polymer composite is described in which a layered, particulate material having reactive organosilane compounds is dispersed in a thermoplastic polymer or vulcanizable rubber.

Yet additional polymer composites containing these so-called nanofillers and/or their methods of preparation are described in U.S. Pat. Nos. 4,739,007; 4,618,528; 4,528, 235; 4,874,728; 4,889,885; 4,810,734; 4,889,885; 4,810, 734; and 5,385,776; WO 95/14733; WO 93/04117; Chem. Mater. Vol. 6, pages 468–474 and 1719–1725; and Vol. 7, pages 2144–2150; and Chem. Mater., Vol. 8, pages 1584–1587 (1996).

U.S. Pat. No. 5,554,670 describes cross-linked, epoxy-based nanocomposites produced from diglycidyl ether of bisphenol A (DGEBA) and certain specific curing agents. This patent teaches that bifunctional primary or secondary amines do not produce delaminated nanocomposite structures and instead result in opaque composites.

Chem. Mater., Vol. 8, pages 1584–1587 (1996) describes the importance of complete ion-exchange in the formation of organoclays to provide nanocomposites with maximized performance.

However, even with these numerous described composites and methods, it still remains desirable to have an improved method for forming polymer composites derived from a multilayered additive to make composites having improved properties over the polymer alone.

Accordingly, in one aspect, the present invention is a polymer composite comprising a hydroxy-functionalized polyether matrix having dispersed therein delaminated or exfoliated particles derived from a multilayered inorganic material which possesses organophilic properties.

In a second aspect, the present invention is a method for forming a composite which method comprises contacting a hydroxy-functionalized polyether or a precursor to the polyether with a multilayered inorganic material which possesses organophillic properties.

In a preferred embodiment, the polymer is a melt processible, thermoplastic hydroxy-functionalized polyether and the method comprises mixing the polymer and a multilayered inorganic material which possesses organophillic properties at conditions sufficient to disperse the multilayered inorganic material into the polymer.

The polymer composites of this invention can exhibit an excellent balance of properties and can exhibit one or more superior properties such as improved heat or chemical resistance, ignition resistance, superior resistance to diffusion of polar liquids and of gases, yield strength in the presence of polar solvents such as water, methanol, or ethanol, or enhanced stiffness and dimensional stability, as compared to composites which contain the same multilayered inorganic material which has not been rendered organophilic.

The polymer composites of the present invention are useful as barrier films, barrier foams, or other molded or extruded thermoplastic articles using any conventional thermoplastic fabrication methods. The articles can be used in a wide variety of applications including transportation (for example, automotive and aircraft) parts, electronics, business equipment such as computer housings, building and construction materials, and packaging material.

In the present invention, the polymer matrix of the polymer composite comprises a hydroxy-functionalized polyether or polyester selected from:

(1) poly(hydroxy ester ethers) having repeating units represented by the formula:

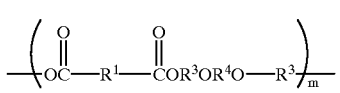

(2) polyetheramines having repeating units represented by the formula:

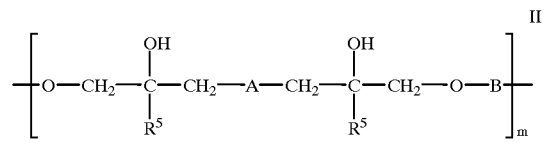

(3) hydroxy-phenoxyether polymers having repeating units represented by the formula:

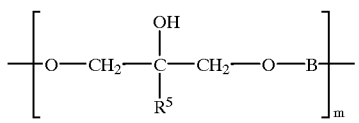

III (4) hydroxy-functional poly(ether sulfonamides) having repeating units represented by the formula:

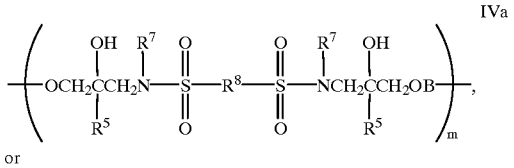

or

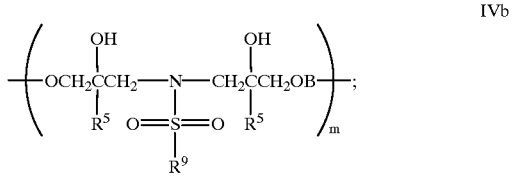

wherein $R^1$ is a divalent organic moiety which is primarily hydrocarbon; $R^2$ is independently a divalent organic moiety which is primarily hydrocarbon; $R^3$ is

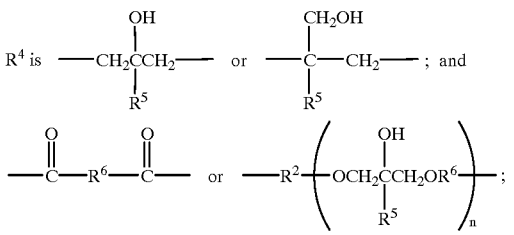

$R^5$ is hydrogen or alkyl; $R^6$ is a divalent organic moiety which is primarily hydrocarbon; $R^7$ and $R^9$ are independently alkyl, substituted alkyl, aryl, substituted aryl; $R^8$ is a divalent organic moiety which is primarily hydrocarbon; A is an amine moiety or a combination of different amine moieties; B is a divalent organic moiety which is primarily hydrocarbon; m is an integer from 5 to 1000; and n is an integer from 0 to 100.

In the preferred embodiment of the present invention, A is 2-hydroxyethylimino-, 2-hydroxypropyl-imino-, piperazenyl, N,N'-bis(2-hydroxyethyl)-1,2-ethylenediimino; and B and $R^1$ are independently 1,3-phenylene, 1,4-phenylene; sulfonyldiphenylene, oxydiphenylene, thiodiphenylene or isopropylidene-diphenylene; $R^5$ is hydrogen; $R^7$ and $R^9$ are independently methyl, ethyl, propyl, butyl, 2-hydroxyethyl or phenyl; and B and $R^8$ are independently 1,3-phenylene, 1,4-phenylene, sulfonyldiphenylene, oxydiphenylene, thiodiphenylene or isopropylidenediphenylene.

The poly(hydroxy ester ethers) represented by Formula I are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820. Alternatively, the poly(hydroxyester ethers) are prepared by reacting a diglycidyl ester with a bisphenol or by reacting a diglycidyl ester or an epihalohydrin with a dicarboxylic acid.

The polyetheramines represented by Formula II are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyetheramines are described in U.S. Pat. No. 5,275,853. The polyetheramines can also be prepared by contacting a diglycidyl ether or an epihalohydrin with a difunctional amine.

The hydroxy-phenoxyether polymers represented by Formula III are prepared, for example, by contacting an epihalohydrin or a diglycidyl ether with a bisphenol. These polymers are described in U.S. Pat. No. 5,496,910.

The hydroxy-functional poly(ether sulfonamides) represented by Formulae IVa and IVb are prepared, for example, by polymerizing an N,N'-dialkyl or N,N'-diaryldisulfonamide with a diglycidyl ether as described in U.S. Pat. No. 5,149,768.

The hydroxy-phenoxyether polymers commercially available from Phenoxy Associates, Inc. are suitable for use in the present invention. These hydroxy-phenoxyether polymers are the condensation reaction products of a dihydric polynuclear phenol, such as bisphenol A, and an epihalohydrin and have the repeating units represented by Formula I wherein Ar is an isopropylidene diphenylene moiety.

The hydroxy-phenoxyether polymers available from Phenoxy Associates, Inc. and the process for preparing them are described in U.S. Pat. No. 3,305,528.

The multilayered inorganic material which may be used in the practice of the invention can be any swellable layered inorganic material. Typically, the layered inorganic material is comprised of layers having two opposing faces which may be relatively flat or slightly curved. Such materials are described in U.S. Pat. No. 4,889,885.

Representative examples of swellable layered inorganic materials employed in the practice of the present invention include the inorganic layered silicates such as montmorillonite, nontronite, beidellite, volkonskoite, hectorite, saponite, sauconite, magadiite, medmontite, kenyaite and vermiculite. Other representative examples include illite minerals such as ledikite; the layered double hydroxides or mixed metal hydroxides such as $Mg_6Al_{3.4}(OH)_{18.8}(CO_3)_{1.7}H_2O$ (see W. T. Reichle, J. Catal., 94 (1985), 547), which have positively charged layers and exchangeable anions in the interlayer spaces; chlorides such as $ReCl_3$ and $FeOCl$, chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4\text{-}2H_2O$, $CaPO_4CH_3\text{-}H_2O$, $MnHAsO_4\text{-}H_2O$ and $Ag_6Mo_{10}O_{33}$. Other swellable layered inorganic materials or multi-layer aggregates having little or no charge on the surface of the layers may also be used in this invention provided they can be intercalated with swelling agents which expand their interlayer spacing. Mixtures of one or more such materials may also be employed.

Preferred swellable layered inorganic materials are those having charges on the layers and exchangeable ions such as sodium, potassium, and calcium cations, which can be exchanged, preferably by ion exchange, with ions, preferably onium ions such as ammonium cations, or reactive organosilane compounds, that cause the multi-lamellar particles to delaminate or swell. Typically, the negative charge on the surface of the swellable layered inorganic materials is at least 20 milliequivalents, preferably at least 50 milliequivalents, and more preferably from 50 to 125 milliequivalents, per 100 grams of the multilayered material.

Particularly preferred are inorganic layered silicates such as montmorillonite, nontronite, beidellite, volkonskoite, hectorite, saponite, sauconite, magadiite, and kenyaite, with hectorite and montmorillonite having from 20 milliequivalents to 150 milliequivalents per 100 grams material. Most preferred swellable layered inorganic materials are inorganic layered silicates having a negative charge on the layers ranging from 0.2 to 0.9 charges per formula unit and a commensurate number of exchangeable cations in the interlayer spaces.

The swellable layered inorganic material can be rendered organophilic by a process known as "intercalation" which comprises introducing intercalants (neutral or charged species) into the interlayer or interfibril spaces of the swellable layered inorganic material by either insertion, in the case of neutral molecules, or ion exchange, in the case of ions. Intercalation can also increase the interlayer spacing of the swellable layered inorganic material. The term "interlayer or interfibril space or spacing" is meant herein the distance between the faces of the layers or the distance between fibrils. In the case of ions, the ions may be exchanged for larger species of the same charge such as, for example, the exchange of sodium or calcium ion with an onium cation. Henceforth, any layered material described containing a neutral or charged species in the interlayer region that results in an increase of the layer spacing prior to the formation of the composite will be referred to as an intercalated material or intercalated inorganic silicate. This description also includes those layered materials or inorganic silicates which have been rendered organophilic. Such materials are commonly known as organoclays.

The intercalants act to weaken the interlayer cohesive energy by swelling the interlayer distances and function to increase the compatibility and bonding of the layers with the polymer matrix by having attractive interaction with both the layers and the polymer. Intercalants which function to swell interlayer or interfibril distances are referred to hereinafter as "swelling agents," those which function to increase the compatibility and bonding of the layers or fibrils with the polymer are referred to as "compatibilizing agents" and those which function as swelling agents and compatibilizing agents are referred to as "swelling/compatibilizing agents."

The intercalant may be introduced into the spaces between every layer or fibril, nearly every layer or fibril of the swellable layered inorganic material, or a significant fraction of the layers or fibrils. The processes of introducing intercalants into the interlayer areas of swellable layered materials are known to those skilled in the art. See, for example, U.S. Pat. No. 4,889,885 to Usuki et al. It is not intended that these methods are limited to any specific process or procedure.

Intercalants typically contain a functional group which reacts with the surface of the layers of the layered material and displaces, totally or in part, the original ions, and bonds to the surface of the layers. These functional groups which are reactive with the polymer include nucleophilic or electrophilic functional groups which are capable of electrophilic or nucleophilic displacement reactions, coupling reactions and varying ring opening reactions. Examples of such functional groups include amino, carboxy, acylhalide, acyloxy, hydroxy, isocyanato ureido, halo, epoxy, and epichlorohydrin.

Typically, the intercalants also include a functional group whose cohesive energies are sufficiently similar to that of the polymer such that the surface of the layers is made more compatible with at least one polymer, thereby enhancing the homogeneity of the dispersion in the polymeric matrix. As used herein, the term "compatible" refers to the extent to which the polymer matrix and the layered material have a favorable interaction which promotes the intermingling of the matrix polymer and the layers of the layered material. Compatibility is derived from one or more of the following criteria: similar cohesive energy densities for the polymer and the derived particles, similar or complimentary capacities for dispersive, polar, or hydrogen bonding interactions, or other specific interactions, such as acid/base or Lewis-acid/Lewis-base interactions. Compatibilization will lead to an improved dispersion of the platelet particles in the matrix and an improved percentage of delaminated (or exfoliated) platelets. The increase in dispersion results in an increase in the average interlayer spacing of the layered material compared to the original intercalated inorganic silicate interlayer spacing prior to contact with the polymer matrix.

The intercalants which can be employed in the practice of the present invention include water-soluble polymers, onium compounds such as an ammonium, phosphonium or sulfonium salt, amphoteric surface-active agents, choline compounds, and organosilane compounds.

Representative examples of water-soluble polymers which can be employed as the organic intercalants in the practice of this invention are water soluble polymers of vinyl alcohol (for example, poly(vinyl alcohol); polyalkylene glycols such as polyethylene glycol; water soluble cellulose polymers such as methyl cellulose and carboxymethyl cellulose; the polymers of ethylenically unsaturated carboxylic acids such as poly(acrylic acid), and their salts; and polyvinyl pyrrolidone.

Representative examples of onium compounds which can be employed as the organic intercalants in the practice of the present invention include quaternary ammonium salts (cationic surface-active agents) having octadecyl, hexadecyl, tetradecyl, or dodecyl moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt dihydroxyethyl methyl octadecyl ammonium salt, dihydroxyethyl methyl hydrogenated tallow ammonium salt, quaternary ammonium salts containing substituents incorporating polyoxyalkylene segments and salts of polyoxyalkylene polyamines, such as the JEFFAMINE products of Huntsman Corp.

Representative examples of the amphoteric surface-active agents which can be employed as the organic intercalants in the practice of this invention include surfactants having an aliphatic amine cationic moiety and a carboxyl, sulfate, sulfone or phosphate as the anionic moiety.

Representative examples of choline compounds which can be employed as the organic intercalants in the practice of this invention include [HOCH$_2$CH$_2$N(CH$_3$)$_3$]+OH—, C$_5$H$_{14}$ClNO, C$_5$H$_{14}$NOC$_4$H$_5$O$_6$, C$_5$H$_{14}$NOC$_6$H$_7$O$_7$, C$_5$H$_{14}$NOC$_6$H1$_2$O$_7$.

Representative examples of organosilane compounds which can be employed as the organic intercalants in the practice of this invention include silane agents of the formula:

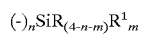

where (-) is a covalent bond to the surface of the layered material, m is 0, 1 or 2; n is 1, 2 or 3 with the proviso that the sum of m and n is equal to 3; R$^1$ is a nonhydrolyzable organic radical (including alkyl, alkoxyalkyl, alkylaryl, arylalkyl, alkoxyaryl) and is not displaceable during the formation of the composite; R is the same or different at each occurrence and is an organic radical which is not hydrolyzable and displaceable during the formation of the composite which is reactive with the polymer matrix or at least one monomeric component of the polymer. Representative R groups include amino, carboxy, acylhalide, acyloxy, hydroxy, isocyanato ureido, halo, epoxy, and epichlorohydryl. Preferred organosilane intercalants include long-chain branched quaternary ammonium salts and/or suitably functionalized organosilane compounds, as disclosed in WO 93/11190, pages 9–21.

Organic materials other than those described can also be employed as the organic intercalants provided they can be intercalated between the layers of the multilayered particulate material.

Preferably, the intercalated layered material of the present invention is an intercalated silicate having a layer thickness of from 7 Å to 12 Å.

The polymer composite of this invention can be formed from the intercalated multilayered material and the hydroxy-functionalized polyether by any suitable process for forming polymer composites.

In cases where the intercalated multilayered material and/or the hydroxy-functionalized polyether are solid or viscous liquids, an inert solvent or diluent can be used advantageously. Suitable such inert solvents or diluents are known to those skilled in the art and includes ketones (such as acetone, methyl ethyl ketone), or hydrocarbons (such as benzene, toluene, xylene, cyclohexane).

If solvents are employed in the preparation of the polymer composite and the resulting product is to be used for coating purposes, the solvent is typically retained in the product. Otherwise, the solvent is removed by any suitable method such as by distillation.

The intercalated layered material can be dispersed in the monomer(s) which form the polymer matrix and the monomer(s) polymerized in situ or alternatively, can be dispersed in the hydroxy-phenoxyether polymer, in melted or liquid form.

Melt-blending is one method for preparing the composites of the present invention. Techniques for melt blending of a polymer with additives of all types are known in the art and can typically be used in the practice of this invention. Typically, in a melt blending operation useful in the practice of the present invention, the hydroxy-phenoxyether polymer is heated to a temperature sufficient to form a polymer melt and combined with the desired amount of the intercalated multilayered material in a suitable mixer, such as an extruder, a Banbury Mixer, a Brabender mixer, or a continuous mixer. The composite may be prepared by shearing the polymer and the intercalated multilayered material in the melt at a temperature equal to or greater than the melting point of the polymer. Mechanical shearing methods are employed such as by extruders, injection molding machines, Banbury type mixers, or Brabender type mixers. Shearing may be achieved by introducing the polymer melt at one end of an extruder (single or double screw) and receiving the sheared polymer at the other end of the extruder. The temperature of the melt, residence time of the melt in the extruder and the design of the extruder (single screw, twin screw, number of flights per unit length, channel depth, flight clearance, mixing zone) are several variables which control the amount of shear to be applied. The melt of the intercalated material and the polymer is subjected to shear mixing until the desired amount of material exfoliates or delaminates to the desired extent. In general, at least about 50 percent by weight, preferably at least about 70 percent by weight, more preferably at least about 80 percent by weight and most preferably at least about 90 percent by weight of the material delaminate to form fibrils or platelet particles substantially homogeneously dispersed in the polymer matrix.

In the practice of the present invention, the melt blending is preferably carried out in the absence of air, as for example, in the presence of an inert gas, such as argon, neon, or nitrogen. However, the present invention may be practiced in the presence of air. The melt blending operation can be conducted in a batch or discontinuous fashion but is more preferably conducted in a continuous fashion in one or more processing zones such as in an extruder from which air is largely or completely excluded. The extrusion can be conducted in one zone or step or in a plurality of reaction zones in series or parallel.

A hydroxy-functionalized polyether melt containing the intercalated, multilayered particulate material may also be formed by reactive melt processing in which the intercalated, multilayered material is initially dispersed in a liquid or solid monomer or cross-linking agent which will form or be used to form the polymer matrix of the composite. This dispersion can be injected into a polymer melt containing one or more polymers in an extruder or other mixing device. The injected liquid may result in new polymer or in chain extension, grafting or even cross-linking of the polymer initially in the melt.

In either the in-reactor blending process or the melt blending process, useful layered and fibrillar inorganic materials are preferably those which have been swollen and or intercalated between layers or fibrils with an organophilic intercalant.

Methods for preparing a polymer composite using in situ type polymerization are also known in the art and reference is made thereto for the purposes of this invention. In applying this technique to the practice of the present invention, the composite is formed by mixing monomers and/or oligomers with the intercalated, multilayered material in the presence or absence of a solvent and subsequently polymerizing the monomer and/or oligomers to form the hydroxy-phenoxyether polymer matrix of the composite. After polymerization, any solvent that is used is removed by conventional means.

Alternatively, the polymer may be granulated and dry-mixed with the intercalated, multilayered material, and thereafter, the composition heated in a mixer until the hydroxy-phenoxyether polymer is melted to form a flowable mixture. This flowable mixture can then be subjected to a shear in a mixer sufficient to form the desired composite. The polymer may also be heated in the mixer to form a flowable mixture prior to the addtion of the intercalated layered material. The intercalated material and polymer are then subjected to a shear sufficient to form the desired composite. The amount of the intercalated multilayered material most advantageously incorporated into the hydroxy-functionalized polyether is dependent on a variety of factors including the specific intercalated material and polymer used to form the composite as well as its desired properties. Typical amounts can range from 0.001 to 90 weight percent of the intercalated, layered material based on the weight of the total composite. Generally, the composite comprises at least about 0.1, preferably about 1, more preferably about 2, and most preferably about 4 weight percent and less than about 60, preferably about 50, more preferably about 45 and most preferably about 40 weight percent of the intercalated, layered material based on the total weight of the composite.

The intercalated, multilayered material is advantageously dispersed under conditions such that at least about 50, preferably at least about 70, more preferably at least about 80, and most preferably at least about 90, weight percent of the layers of the intercalated, multilayered, material delaminate or exfoliate to form individual layers or stacks of layers that are substantially homogeneously dispersed in the polymer matrix. These layers may be platelet particles having two relatively flat or slightly curved opposite faces where the distance between the faces is relatively small compared to the size of the faces, or needle-like particles. It is quite probable that the layers of the filler will not delaminate completely in the polymer, but will form layers in a coplanar aggregate. These layers are advantageously sufficiently dispersed or exfoliated in the matrix polymer such that at least 50 percent of the layers are in small multiples of less than about 30, preferably less than about 20, and more preferably less than about 5, of the layers.

The dimensions of the dispersed delaminated layers may vary greatly, but in the case of particles derived from clay minerals, the particle faces are roughly hexagonal, circular, elliptical, or rectangular and exhibit maximum diameters or length from 50 Å to 2,000 Å. As such, the aspect ratio of length/thickness ranges from 10 to 2,000. The aspect ratio which is most advantageously employed will depend on the desired end-use properties. The particle faces may also be needle-like.

Optionally, the polymer composites of the present invention may contain various other additives such as nucleating agents, other fillers, lubricants, plasticizers, chain extenders, colorants, mold release agents, antistatic agents, pigments, or fire retardants. The optional additives and their amounts employed are dependent on a variety of factors including the desired end-use properties.

The polymer composites of this invention exhibit useful properties. For example, they may exhibit enhanced yield strength and tensile modulus, even when exposed to polar media such as water or methanol; enhanced heat resistance and impact strength; improved stiffness, wet-melt strength, dimensional stability, and heat deflection temperature, and decreased moisture absorption, flammability, and permeability as compared to the same polymers which contain the same multilayered material which has not previously been intercalated or where no intercalated material is employed. Improvements in one or more properties can be obtained even though small amounts of intercalated multilayered materials are employed.

The properties of the polymer composites of the present invention may be further enhanced by post-treatment such as by heat treating, orienting or annealing the composite at an elevated temperature, conventionally from 80° C. to 230° C. Generally, the annealing temperatures will be more than about 100° C., preferably more than about 110° C., and more preferably more than about 120° C., to less than about 250° C., preferably less than about 220° C., and more preferably less than 180° C.

The polymer composites of the present invention can be molded by conventional shaping processes such as melt-spinning, casting, vacuum molding, sheet molding, injection molding and extruding, melt-blowing, spun-bonding, blow-molding, and co or multilayer extrusion. Examples of such molded articles include components for technical equipment, apparatus castings, household equipment, sports equipment, bottles, containers, components for the electrical and electronics industries, car components, and fibers. The composites may also be used for coating articles by means of powder coating processes or as hot-melt adhesives.

The polymer composites of the present invention may be directly molded by injection molding or heat pressure molding, or mixed with other polymers. Alternatively, it is also possible to obtain molded products by performing the in situ polymerization reaction in a mold.

The polymer composites according to the invention are also suitable for the production of sheets and panels using conventional processes such as vacuum or hot pressing. The sheets and panels can be laminated to materials such as wood, glass, ceramic, metal or other plastics, and outstanding strengths can be achieved using conventional adhesion promoters, for example, those based on vinyl resins. The sheets and panels can also be laminated with other plastic films by coextrusion, with the sheets being bonded in the molten state. The surfaces of the sheets and panels, can be finished by conventional methods, for example, by lacquering or by the application of protective films.

The polymer composites of this invention are also useful for fabrication of extruded films and film laminates, as for example, films for use in food packaging. Such films can be fabricated using conventional film extrusion techniques. The films are preferably from 10 to 100, more preferably from 20 to 100, and most preferably from 25 to 75, microns thick.

The polymer composites of the present invention may also be useful in preparing fiber-reinforced composites in which a resin matrix polymer is reinforced with one or more reinforcing materials such as a reinforcing fiber or mat. Fibers which can be employed in the process of the present invention are described in numerous references, such as, for example, U.S. Pat. No. 4,533,693; Kirk-Othmer Ency. Chem. Tech., *Aramid Fibers,* 213 (J. Wiley & Sons 1978); Kirk-Othmer Ency. Chem., Tech. - Supp., *Composites, High Performance, pages* 261–263; Ency. Poly. Sci. & Eng. The fibers can be of varying composition, provided that they do not melt as a composite is made therewith and, in general, are chosen so that the fibers provide improvements in physical properties, such as tensile strength, flexural modulus, and electrical conductivity. Thus, high flexural modulus organic polymers such as polyamides, polyimides, and aramids, metals, glass and other ceramics, carbon fibers, and graphite fibers are suitable fiber materials. Examples of glass fibers, include E-glass and S-glass. E-glass is a low alkali, aluminum-borosilicate composition with excellent electrical properties and good strength and modulus. S-glass is a magnesium-aluminosilicate composition with considerably higher strength and modulus. Fiber rovings are also useful. A roving consists of a number of continuous yarns, strands, or tows collected into a parallel bundle with little or no twist.

The following working examples are given to illustrate the invention and should not be construed as limiting its scope. Unless otherwise indicated, all parts and percentages are by weight.

EXAMPLE 1

Two phenoxy polymers, Polymer A and Polymer B, were melt-compounded individually with each of two commercially available, organically-modified, montmorillonite clay-based, layered silicate products (Clay A and Clay B) on a Haake torque rheometer at a temperature between 187° C. and 205° C., for 20 to 30 minutes, at 100 rpm using roller-type blades. Ten weight percent of clay product based on total compound weight was used. Polymer A is PKHH, a commercial product from Phenoxy Associates, Rock Hill, S.C., described as a bisphenol A-epichlorohydrin based phenoxy polymer. Polymer B is a high polymeric reaction product of monoethanolamine and the diglycidyl ether of bisphenol A such as disclosed in U.S. Pat. No. 5,275,853. Clay A was a Na-montmorillonite that had been cation-exchanged with dimethyl, benzyl tallow ammonium chloride and Clay B was a Na-montmorillonite that had been cation-exchanged with dimethyl, ditallow ammonium chloride. Both clays are products of Southern Clay Products, Inc., Gonzales, Tex.

The four compounds were compression-molded into plaques from which tensile test specimens were machined. The results of those tests are shown in Table I.

TABLE I

| Polymer | Clay | Tensile Strength at Break, psi | Elongation at Break, percent | Tensile Modulus, psi |
|---|---|---|---|---|
| A | None | 9,200 | 77 | 387,000 |
| A | Clay B | 6,900 | 4.3 | 473,000 |
| A | Clay A | 9,500 | 2.0 | 700,000 |
| B | None | 7,300 | 84 | 400,000 |
| B | Clay B | 6,300 | 7.8 | 530,000 |
| B | Clay A | 5,300 | 9.5 | 570,000 |

These results demonstrate a substantial increase in modulus with retention of sufficient strength and ductility.

EXAMPLE 2

Polymer A was melt-blended with Clay A at a 5 weight percent loading, and Clay C (a Na-montomorillonite that had been cation-exchanged with methyl, bis(2-hydroxyethyl), tallow ammonium chloride), at a 5 weight percent loading. Both composites exhibited significant dispersion of the multilayered material as indicated by the significant improvement in the storage modulus of the melt compounded preparations compared to the base polymer. At room temperature, the Clay A preparation had an improvement of approximately 34.0 percent versus the blank polymer. The Clay C preparation had an improvement of 29.2 percent based upon data obtained with dynamic mechanical spectroscopy (DMS). The results of the test are shown in Table II.

TABLE II

| Preparation | Storage Modulus |
|---|---|
| Blank Polymer A | $1.03 \times 10(10)$ dyn/cm$^2$ |
| Polymer A with 5 wt % Clay A | $1.38 \times 10(10)$ dyn/cm$^2$ |
| Polymer A with 5 wt % Clay C | $1.31 \times 10(10)$ dyn/cm$^2$ |

Microtensile testing results of the 5 weight percent Clay A composite and a composite containing 5 weight percent of Clay D, are shown in Table III. Clay D is an organoclay which is a Na-montomorillonite that had been cation-exchanged with bis(2-hydroxyethyl), tallow ammonium hydrochloride and which does not disperse in the manner previously described but behaves as a conventional filler.

TABLE III

| Preparation | Modulus (Ksi) |
|---|---|
| Blank Polymer A | 399.0 |
| Polymer A with 5 wt % Clay D | 469.2 |
| Polymer A with 5 wt % Clay A | 604.5 |

Oxygen transmission rate data was also obtained for the previously described preparations. Both preparations had improved oxygen barrier properties when compared to the base polymer. Oxygen transmission was measured as (cc-mil/(100 in$^2$-day-atm oxygen)). The test results are shown in Table IV

TABLE IV

| Preparation | Oxygen Transmission (cc-mil/(100 in$^2$-day-atm oxygen) | % improvement (Decline in Rate) |
|---|---|---|
| Blank Polymer A | 7.57 | |
| Polymer A with 5 wt % Clay A | 5.04 | 33.4 |
| Polymer A with 5 wt % Clay C | 5.55 | 26.6 |

EXAMPLE 3

A polymer, (Polymer C) resulting from the reaction of monoisopropanolamine and the diglycidyl ether of bisphenol A such as disclosed in U.S. Pat. No. 5,275,853, was melt-blended with Clay A. Loadings of 5, 10 and 15 weight percent Clay A were prepared. The approximate melt-blending conditions were as follows: 5 weight percent, 150 rpm, 130° C., 15 minutes; 10 weight percent, 150 rpm, 130° C., 20 minutes; 15 weight percent, 150 rpm, 130° C., 20 minutes. The 10 and 15 weight percent preparations were tested for storage modulus using dynamic mechanical spectroscopy. The composites had significant improvement in the storage modulus. Approximately, a 57 percent improvement in the storage modulus was observed at room temperature for the 10 weight percent sample and an approximately 86 percent improvement in the storage modulus was observed for the 15 weight sample at room temperature compared to the blank polymer, as shown in Table V.

TABLE V

| Preparation | Storage Modulus |
|---|---|
| Blank Polymer C | $1.16 \times 10^{(10)}$ dyn/cm$^2$ |
| Polymer C with 10 wt % Clay A | $1.82 \times 10^{(10)}$ dyn/cm$^2$ |
| Polymer C with 15 wt % Clay A | $2.16 \times 10^{(10)}$ dyn/cm$^2$ |

Microtensile testing results of a 5 weight percent and the 10 weight (approximate melt-blend conditions: 5 weight percent, 150 rpm, 130° C., 15 minutes; 10 weight percent, 150 rpm, 130° C., 10 minutes) composites were also obtained. The storage modulus and percent Strain at Break are shown in Table VI.

TABLE VI

| Preparation | % Strain at Break | Storage Modulus(Ksi) | % Increase Storage Modulus |
|---|---|---|---|
| Blank Polymer C | 107.5 | 453.4 | |
| Polymer C with 5 wt % Clay A | 10.8 | 556.7 | 18.6 |
| Polymer C with 10 wt % Clay A | 1.8 | 720.9 | 59.0 |

EXAMPLE 4

Polymer C was melt-blended with Clay C. The composite was prepared by blending the melted polymer with the organoclay at approximately 150 ° C., 150 rpm for approximately 15 minutes. Microtensile testing results of the material indicated an increase in modulus compared to the base polymer. The composite had a modulus of 480.26 Ksi and a percent Strain at Break of 4.29 percent versus the blank Polymer C used in Example 3.

Polymer C was melt-blended with 5 weight percent Clay C. The composite was prepared by blending the melted polymer with the organoclay at approximately 150° C., 100 rpm for approximately 20 to 30 minutes. Oxygen transmission rate data was obtained for blank Polymer C and the 5 weight percent composite of Polymer C with Clay C. Blank Polymer C had an oxygen transmission rate of 1.43 (cc-mil/(100 in$^2$-day-atm O$_2$). The composite had an oxygen transmission rate of 1.10 (cc-mil/(100 in$^2$-day-atm O$_2$). This is a 23.1 percent increase in the oxygen barrier property of the composite compared to blank Polymer C.

EXAMPLE 5

A polymer (Polymer D) resulting from the reaction of piperazine and the diglycidyl ether of bisphenol A, such as disclosed in U.S. Pat. No. 5,275,853, was melt blended with Clay C. Four weight percent and 10 weight percent loadings of Clay C were prepared. The Polymer D/4 weight percent Clay C composite (melt blended above the $T_g$ of Polymer D at approximately 150° C., 175 rpm, approximately 20 m) had significant improvement in oxygen barrier properties, 1.85 versus 1.4 cc-mil/(100 in$^2$-day-atm O$_2$), a 23.6 percent improvement.

The Polymer D/10 weight percent Clay C preparation had significant improvement in storage modulus as determined by dynamic mechanical spectroscopy. The storage moduli for the blank polymer and composite at room temperature are listed below. A 71.7 percent increase was obtained in the storage modulus of the composite.

TABLE VII

| Preparation | Storage Modulus |
|---|---|
| Blank Polymer D | 9.67 × 10$^{(9)}$ dyn/cm$^2$ |
| Polymer D with 10 wt % Clay C | 1.66 × 10$^{(10)}$ dyn/cm$^2$ |

EXAMPLE 6

To 62.15 g of a commercial diglycidyl ether of bisphenol A was added 4.38 g Clay A as described above. This epoxy-clay mixture was stirred vigorously with a shear blade and heated to 70° C. over a period of 45 minutes, then to 110° C., whereupon the mixture became less opaque. The mixture was cooled to 80° C., diluted with 89.1 g tetrahydrofuran, and cooled to 55° C. Monoethanolamine (MEA, 21.06 g) was added and the temperature maintained at 55° C. for 3 hours. Two drops of MEA were added. After one additional hour, two more drops of MEA were added. After 90 minutes of additional reaction time, the solution was cooled and stirred overnight in an open container to allow some solvent to evaporate. The final calculated percent non-volatile content of the solution was 44.2 percent by weight.

A film was cast from this solution onto poly(ethylene terephthalate) film. When the solvent was evaporated, this resulting film was tack-free, flexible, and adhered well. A film cast on a glass microscope slide was examined at 600 X magnification with cross-polarized light. Most of the clay product was not visible; a few remnants, presumably from the original particles, remained, but were less than 3 microns in size.

EXAMPLE 7

A portion (1.416 g) of the epoxy-clay mixture described in Example 6 was placed in a test tube. Monoethanolamine (0.4579 g) was added and the mixture warmed and mixed by shaking. The mixture exothermed, became clear, and the yellowish color faded. The material did not cross-link, and could be repeatedly heated up to allow thermoplastic flow. When cool, the material was clear, colorless, tacky resinous solid, indicated relatively low molecular weight as obtained. The material was pressed between glass plates and examined using a polarizing light microscope. The remaining visible particles were in the range of 10 to 30 microns in size.

What is claimed is:

1. A polymer composite comprising a polymer portion of a hydroxy-functionalized polyether or polyester and a particle portion dispersed therein comprising delaminated particles derived from a multilayered inorganic material which possesses organophilic properties wherein the polymer composite provides reduced oxygen transmission as compared to the polymer portion.

2. The polymer composite of claim 1 wherein the hydroxy-functionalized polyether or polyester is formed by the reaction of a dinucleophile and a monomer containing at least one epoxy moiety.

3. The polymer composite of claim 1 wherein the hydroxy-functionalized polyether is represented by the formula:

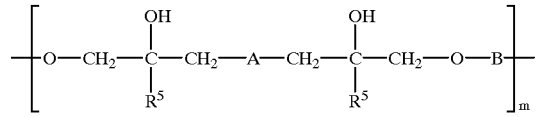

wherein A is an amine moiety or a combination of different amine moieties; B is a divalent organic moiety which is predominantly hydrocarbylene; R is alkyl or hydrogen; and m is an integer from 5 to 1000.

4. The polymer composite of claim 3 wherein A is 2-hydroxyethylimino-, 2-hydroxypropylimino-, piperazenyl, N,N'-bis(2-hydroxyethyl)-1,2-ethylenedimino-, and B is isopropylidenediphenylene, 1,3-phenylene, or 1,4-phenylene, and R$^5$ is hydrogen.

5. The polymer composite of claim 3 wherein the hydroxy-functionalized polyether is formed by the reaction of a diglycidyl ether or an epihalohydrin with a difunctional amine.

6. The polymer composite of claim 1 further comprising a fatty acid derived intercalating agent, wherein the multilayered inorganic material is a swellable layered material.

7. The polymer composite of claim 6 wherein the swellable layered material is an inorganic layered silicate.

8. The polymer composite of claim 6 wherein the inorganic layered silicate is a montmorillonite, hectorite, saponite, nontronite, beidellite, volhonskoite, sauconite, magadiite, medmontite, kenyaite, or vermiculite.

9. The polymer composite of claim 6 wherein the inorganic layered silicate has a cation exchange capacity between 20 and 150 milliequivalents, more preferably between 50 and 125 milliequivalents per 100 g of multilayered material.

10. The polymer composite of claim 9 wherein the intercalating agent is tallow-derived.

11. The polymer composite of claim 10 wherein the intercalating agent is selected from the group consisting of dimethyl, benzyl tallow ammonium chloride; dimethyl ditallow ammonium chloride; methyl bis(2-hydroxyethyl) tallow ammonium chloride, and bis(2-hydroxyethyl), tallow ammonium chloride.

12. The polymer composite of claim 10 wherein the intercalating agent is dimethyl, benzyl tallow ammonium chloride.

13. The composite of claim 12 wherein the intercalating agent is methyl bis(2-hydroxyethyl), tallow ammonium chloride.

14. The polymer composite of claim 7 wherein the inorganic layered silicate is at least 0.1 weight percent and not more than 90 weight percent of the final composite.

15. The polymer composite of claim 7 wherein the inorganic layered silicate present in the polymer composite has a greater interlayer spacing than the inorganic silicate before it is added to the polymer matrix.

16. The polymer composite of claim 7 formed by blending the inorganic layered silicate and the hydroxy-functionalized polyether or polyester polymer above the $T_g$ of the polymer.

17. The polymer composite of claim 7 formed by adding the inorganic layered silicate to one or more of the monomers forming the hydroxy-functionalized polyether or polyester matrix and then polymerizing the monomers.

18. The composite of claim 1 in the form of a coating, film, foam, laminate, fiber, hot-melt adhesive or molded article.

19. A method for forming a composite which comprises contacting a hydroxy-functionalized polyether or polyester, or a precursor to a hydroxy-functionalized polyether or polyester with an inorganic layered filler intercalated with an organic intercalant and optionally an ionic or non-ionic inorganic intercalant.

20. A fiber-reinforced composite comprising a resin matrix polymer reinforced with one or more reinforcing fiber or mat, wherein the resin matrix polymer is the composite of claim 1.

21. A method for increasing the interlayer distance of an inorganic layered silicate which comprises blending the inorganic layered silicate with a fatty acid derived intercalating agent.

* * * * *